(12) United States Patent
Furukawahara et al.

(10) Patent No.: US 7,712,370 B2
(45) Date of Patent: May 11, 2010

(54) METHOD OF DETECTING OCCURRENCE OF STICKING OF SUBSTRATE

(75) Inventors: Kazunori Furukawahara, Tama (JP); Katsutoshi Ishigami, Tama (JP)

(73) Assignee: ASM Japan K.K., Tokyo (JP)

( * ) Notice: Subject to any disclaimer, the term of this patent is extended or adjusted under 35 U.S.C. 154(b) by 444 days.

(21) Appl. No.: 11/615,784

(22) Filed: Dec. 22, 2006

(65) Prior Publication Data
US 2008/0148857 A1 Jun. 26, 2008

(51) Int. Cl.
*G01N 29/00* (2006.01)
(52) U.S. Cl. .................. 73/649; 73/1.79; 73/865.8
(58) Field of Classification Search ............ 73/649, 73/54.61, 517, 721, 1.79, 1.82, 865.9; 414/935, 414/936, 939, 940
See application file for complete search history.

(56) References Cited

U.S. PATENT DOCUMENTS 6,205,870 B1 * 3/2001 Hosokawa et al. ......... 73/865.9
6,257,045 B1 * 7/2001 Hosokawa et al. ........... 73/1.79
6,281,033 B1 * 8/2001 Uayanagi et al. ............. 438/50
6,346,735 B1 * 2/2002 Ueyanagi et al. ........... 257/415
6,483,283 B2 * 11/2002 Uayanagi et al. .......... 324/71.5

FOREIGN PATENT DOCUMENTS

JP 2004-335570 A 11/2004

* cited by examiner

*Primary Examiner*—J M Saint Surin
(74) *Attorney, Agent, or Firm*—Knobbe, Martens, Olson & Bear LLP

(57) ABSTRACT

Sticking of a substrate occurs in a reaction chamber for processing the substrate placed on a surface of a substrate-supporting device provided with lift pins for moving the substrate up and down with respect to the surface of the substrate-supporting device. A method of detecting the occurrence of the sticking of the substrate includes: monitoring a vibration propagating in or through the reaction chamber by a sensor, which vibration is indicative of or specific to sticking of the substrate on the surface of the substrate-supporting device when being moved up from the surface of the substrate-supporting device with the lift pins; and initiating a pre-designated sequence if the vibration is detected while processing the substrate in the reaction chamber.

26 Claims, 2 Drawing Sheets

METHOD OF DETECTING OCCURRENCE OF STICKING OF SUBSTRATE

BACKGROUND OF THE INVENTION

1. Field of the Invention

The present invention generally relates to a method of detecting the occurrence of sticking of a substrate to a supporting surface, particularly to a susceptor surface during a semiconductor-manufacturing process.

2. Description of the Related Art

There are cases where the substrate is charged with electricity and sticks to the electrode while film is being formed on the substrate. If the substrate gets stuck, operating the lift pins to lift the substrate for transfer may cause the stuck substrate to rebound, resulting in displacement or cracking of the substrate.

If the substrate is transferred in this condition, various problems may occur such as the substrate not transferred to the accurate position, being dropped during transfer, or damaging the end effector of the robot due to contact between the substrate and end effector.

SUMMARY OF THE INVENTION

In an embodiment of the present invention, sticking of the substrate is detected based on sound and vibration around the chamber. In the case of detecting substrate sticking based on sound around the chamber, detecting the sticking sound is difficult because the sticking sound that generates in the chamber is muffled by noises from the apparatus, ambient noises in the surroundings, etc. However, the sticking sound generates as a result of contact between the lift pins and substrate, for example, and this means that the sound can also be captured as vibration. In other words, when the stuck substrate is raised by the lift pins, for example, the substrate rebounds and the sound of the back of the substrate contacting the lift pins is transmitted through the apparatus as vibration. By installing a sensor to the chamber, etc., to reduce the effect of ambient noises, the sticking sound can be captured as vibration.

In an embodiment of the present invention, sound, vibration and other phenomena occurring when the substrate is transferred are monitored by means of installing, on the processing apparatus, a sensor for detecting sound, vibration, etc. This way, the sound and vibration of sticking, as well as sounds and vibrations that do not normally generate while the substrate is transferred, can be detected.

As a favorable embodiment, only sounds and vibrations associated with the substrate can be detected by applying filtering that mostly or mainly passes sounds and vibrations associated with the substrate and thereby cuts off noises in the environment where the apparatus is installed or noises generated by the operation of the apparatus.

In a different embodiment, a timing signal can be output from the apparatus when the substrate is lifted up in order to prevent malfunction wherein, specifically, sound and vibration are monitored to detect sticking or abnormality of the substrate only when this signal is output.

In another embodiment, a function can be provided whereby the substrate transfer operation can be stopped by sending a signal to the processing apparatus upon detection of sticking or abnormality of the substrate.

In an embodiment, the terms "sound" and "vibration" are used synonymously.

According to an embodiment of the present invention, a sensor that picks up sound, vibration, etc., is installed on the processing apparatus to detect sticking of the substrate or abnormality of the substrate while the substrate is being transferred, and stop the transfer operation upon detection of sticking or abnormality, thereby preventing contact between the substrate and end effector and keeping the utilization of the apparatus from dropping. If the substrate cracks or contacts the end effector in the processing apparatus, the subsequent recovery of the apparatus requires time because a number of tasks need to be performed including cleaning of the interior of the apparatus, teaching of the transfer robot, evacuation, and leak check. In an embodiment, at least one of the aforementioned problems can be resolved.

For purposes of summarizing the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

DETAILED DESCRIPTION OF THE PREFERRED EMBODIMENT

Figure 1:
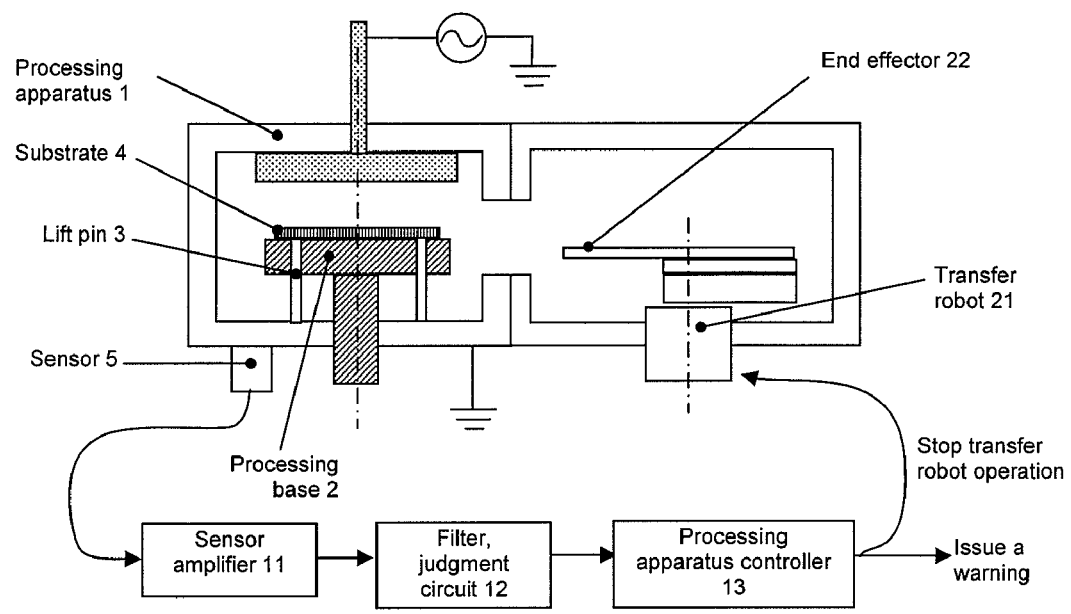
FIG. 1 is a schematic diagram of a sticking detection system for a plasma CVD apparatus according to an embodiment of the present invention.

The present invention will be explained in detail with reference to preferred embodiments. However, the preferred embodiments are not intended to limit the present invention.

In an embodiment which can achieve at least one of the above objectives, the present invention provides a method of detecting the occurrence of sticking of a substrate in a reaction chamber for processing the substrate placed on a surface of a substrate-supporting device provided with lift pins for moving the substrate up and down with respect to the surface of the substrate-supporting device, comprising the steps of: (i) monitoring a vibration propagating in or through the reaction chamber by a sensor installed outside the reaction chamber, said vibration being indicative of or specific to sticking of the substrate on the surface of the substrate-supporting device when being moved up from the surface of the substrate-supporting device with the lift pins; and (ii) initiating a pre-designated sequence if the vibration is detected while processing the substrate in the reaction chamber.

The above embodiment includes, but is not limited to, the following embodiments which may achieve one or more of the above objectives.

In an embodiment, the vibration indicative of or specific to the sticking of the substrate may be detected when the vibration has an intensity exceeding a pre-determined threshold value. The vibration indicative of or specific to the sticking of the substrate may be detected only when the substrate is moved up by the lift pins. The step of monitoring the vibration may comprise monitoring an acceleration (m/s$^2$) of vibrations including the vibration indicative of or specific to the sticking of the substrate. The vibration indicative of or specific to the sticking of the substrate may have a frequency of more than 4 kHz and less than 8 kHz.

In an embodiment, the step of monitoring the vibration may comprise: (a) sensing vibrations propagating in or through the reaction chamber by the sensor; and (b) filtering a signal outputted from the sensor to detect the vibration indicative of the sticking of the substrate, based on the frequency of the vibrations. In the above, the step of filtering the signal may comprise: (b1) filtering out a portion of the signal having frequencies of 4 kHz or less; and (b2) filtering out a portion of the signal having frequencies of 8 kHz or more.

In an embodiment, the step of initiating the pre-designated sequence may comprise setting off a warning signal and stopping a process of transferring the substrate.

In an embodiment, the sensor may use a piezoelectric element which outputs electrons.

In an embodiment, the sensor may be installed on an outer surface of a portion of the reaction chamber, said portion being capable of propagating the vibration generated by an impact caused when a back surface of the substrate is rebounded against tips of the lift pins. The sensor may be installed on an outer metal surface at a bottom of the reaction chamber. The substrate-supporting device may be a susceptor, and the reaction chamber may be a reactor for semiconductor-processing. The lift pins may be inserted in through-holes formed in the substrate-supporting device through the surface in its axial direction. The vibration indicative of or specific to the sticking of the substrate may be detected only when the substrate is moved up by the lift pins after a film is formed on the substrate and the susceptor descends to a position for transferring the substrate.

The present invention can equally be applies to a system. In an embodiment, the present invention provides a system of detecting the occurrence of sticking of a substrate in a reaction chamber for processing the substrate placed on a surface of a substrate-supporting device provided with lift pins for moving the substrate up and down with respect to the surface of the substrate-supporting device, comprising: (i) a sensor for monitoring a vibration propagating in or through the reaction chamber, said sensor being installed outside the reaction chamber, said vibration being indicative of or specific to sticking of the substrate on the surface of the substrate-supporting device when being moved up from the surface of the substrate-supporting device with the lift pins; and (ii) a controller for initiating a pre-designated sequence if the vibration is detected while processing the substrate in the reaction chamber.

The above embodiment includes, but is not limited to, the following embodiments which may achieve one or more of the above objectives.

The controller may detect the vibration indicative of or specific to the sticking of the substrate when the vibration has an intensity exceeding a pre-determined threshold value. The controller may detect the vibration indicative of or specific to the sticking of the substrate only when the substrate is moved up by the lift pins. The sensor may monitor an acceleration (m/s$^2$) of vibrations including the vibration indicative of or specific to the sticking of the substrate.

The sensor may monitor vibrations having a frequency of more than 4 kHz and less than 8 kHz. The system may further comprise a band pass filter for filtering out a portion of the signal having frequencies of 4 kHz or less and a portion of the signal having frequencies of 8 kHz or more. The controller may set off a warning signal and stop a process of transferring the substrate when the vibration is detected.

In the above, the embodiments of the method and the embodiments of the system can be used singly or in any combinations and can interchangeably be used.

As explained above, if film is formed in a condition where the substrate is placed on the film-forming processing base in the processing apparatus, the substrate is charged with electricity and sticks to the processing base, and this sticking may cause the substrate to rebound when the substrate is lifted by the lift pins after the processing is completed, or may lead to abnormality during transfer leading to displacement or cracking of the substrate. If the transfer operation is performed in this condition, the substrate may not be removed at the accurate position, may drop during the transfer, or may crack and thereby contact and ultimately damage the end effector of the transfer robot. If the substrate is cracked or end effector is damaged, the lines of the processing apparatus need to be released to atmosphere. The recovery of the apparatus takes time, and the utilization of the processing apparatus drops. In an embodiment of the present invention, rebounding of the substrate or abnormality during transfer, caused by sticking, is captured as sound or vibration indicative of contact between the substrate and lift pins, or between the substrate and processing base, so as to detect such abnormality of the substrate. An embodiment of the present invention is explained below using drawings. However, it should be noted that the present invention is not at all limited to these drawings or embodiment.

The processing apparatus shown in FIG. 1 is a plasma CVD film forming apparatus 1. The present invention can be applied not only to plasma CVD film forming apparatuses, but also to thermal CVD film forming apparatuses, plasma or thermal ALD film forming apparatuses, etching apparatuses, annealing apparatuses, UV irradiation apparatuses, and other apparatuses used to process substrates. The apparatus shown in FIG. 1 typically has multiple lift pins 3 (normally three pins; however, four or more lift pins may be used and the number of pins is not limited in any way) that pierce through a substrate support (susceptor) 2 on which a substrate 4 is placed, and the substrate 4 on the support is moved up and down with respect to the surface of the support in conjunction with the up/down movements of the substrate support 2.

In this embodiment, a sensor 5 for capturing sound and vibration is installed on the apparatus. This sensor 3 may be one capable of detecting contact sound and vibration by picking up frequencies of several Hz through approx. 20 kHz, but any other sensor can be used as long as it is suitable for detecting contact sound and vibration indicative of sticking of the substrate. The sensor 3 used in this embodiment is a contact acceleration pickup of charge-output type using a piezoelectric element, but a sensor with a built-in preamplifier to output voltage can also be used. A sensor of any model or type can be selected without limitation, as long as the sensor is suitable for detecting contact sound and vibration indicative of sticking of the substrate. If the chamber is subject to high temperatures, however, it is preferable to use a charge-output type sensor without built-in amplifier in order to withstand higher temperatures. One example of an actual sensor device is a charge-output type sensor NP2130 (by Ono Sokki) connected to a judgment device via a charge converter 6130 that converts electrical charge into voltage. However, the sensor device is not at all limited to this configuration.

In this example, signals from the sensor 5 are converted or amplified by a charge converter or amplifier 11, and then passed through a band pass filter to filter frequencies of sound and vibration indicative of contact between the substrate and lift pins, or between the substrate and processing base, after which the filtered signals are sent to a filter/judgment circuit 12 that determines abnormality against vibration acceleration thresholds. Since general control motors, etc., produce vibrations of 4 kHz or less, and also in consideration of the evaluation results on actual apparatuses, in an embodiment frequencies of 4 kHz or less and 8 kHz or more are filtered.

Whether or not to apply a filter, and which frequencies should be filtered, can be selected as deemed appropriate in accordance with the sticking sound and vibration to be detected. The generation of sticking sound and vibration, as well as the transfer characteristics of vibration, can vary according to the material and shape of the lift pins, material and shape of the sticking surface of the substrate, material and shape of the placement surface of the processing base, material and shape of the interior walls of the apparatus, structure of the apparatus, structure of the drive part, drive mechanism, various parts constituting the apparatus, and peripheral equipment used around the apparatus, among others, or even the degree of sticking or type of processing applied to the substrate. Accordingly, in an embodiment it is desired that effective frequencies for detecting sticking sound and vibration, filtering frequencies, detection thresholds and other items be set beforehand for each target in consideration of the characteristics of the sensor, etc. As a result, sticking can be detected effectively in a range of 4 to 8 kHz in an embodiment, while a desired detection range can be set by combining, as deemed appropriate, frequency ranges with a lower limit of 0.5, 1, 2, 3, 4, 5, 6 or 7 kHz and an upper limit of 5, 6, 7, 8, 9, 10, 15 or 20 kHz. In another embodiment, a frequency range other than those mentioned above may be used for detection. The aforementioned measurement frequency range may merely be effective in detecting vibrations in the applicable range, and as long as this is possible use of a filter is not necessary or the filter level can also be adjusted appropriately. The thresholds may be set so that detection becomes possible, and for example settings that allow for detection at intensities of measured values of 1.3 times or more (such as 1.5 times or 2 times) can be used in an environment subject to significant noises, or settings that allow for detection at intensities of measured values of 1.1 times or more (such as 1.2 times) can be used in an environment where noises are minimal. Alternatively, vibration waveforms in the measurement frequency range can be used, instead of using thresholds corresponding to a given frequency range.

Examples of the filter include a hardware circuit filter (LC circuit) and a digital (software) filter. In an embodiment, a digital filter can be applied as a function of the judgment device. Specifically, vibration is converted to voltage change (frequency), which is then digitized and fed to software to cut off specified frequencies.

Next, if the judgment circuit determines that sticking was detected, the applicable judgment signal is sent to an apparatus controller 13 to stop the substrate transfer operation and issue a warning. As a result, controls are implemented that prevent a transfer robot 21 and end effector 22 from operating.

It is also possible, for the purpose of preventing malfunction caused by judgment operation on a regular basis, to output a substrate lift-up timing signal from another apparatus controller (not illustrated) to the judgment circuit so that when this signal is output to the judgment circuit, the signal can be used to start or stop the judgment operation.

The specific physical quantity based on which to detect occurrence of sticking may be sound pressure, displacement, acceleration or other quantities that indicate vibration. Among these, acceleration ($m/s^2$) was used in the following example. Vibration can also be expressed in dB, which is a dimensionless unit.

The position of the sensor 5 is not specifically limited. Also, while the lift pins 3 contact the bottom of the reaction chamber 1 in FIG. 1, vibration can be sufficiently detected in an apparatus where the lift pins do not contact the reaction chamber. Although the lift pins are installed at the bottom part of the reaction chamber in FIG. 1, it is also possible to install the pins on the side face or top face. However, the top face of the apparatus in FIG. 1 has a separate structure (showerhead structure), while the side face is covered with a heat-insulating cover. Since these factors prevent the lift pins from directly coming in contact with the reaction chamber to which sound (vibration) is transmitted, the lift pins are installed on the bottom face as this is the only exposed surface. The sensor is typically installed on the exterior of the apparatus. Although installing the vibration sensor and signal cable inside the reaction chamber is difficult because the reaction chamber is filled with active gas, installing the above parts in the reaction chamber is possible if they are protected by a material resistant to active gas.

Figure 2:
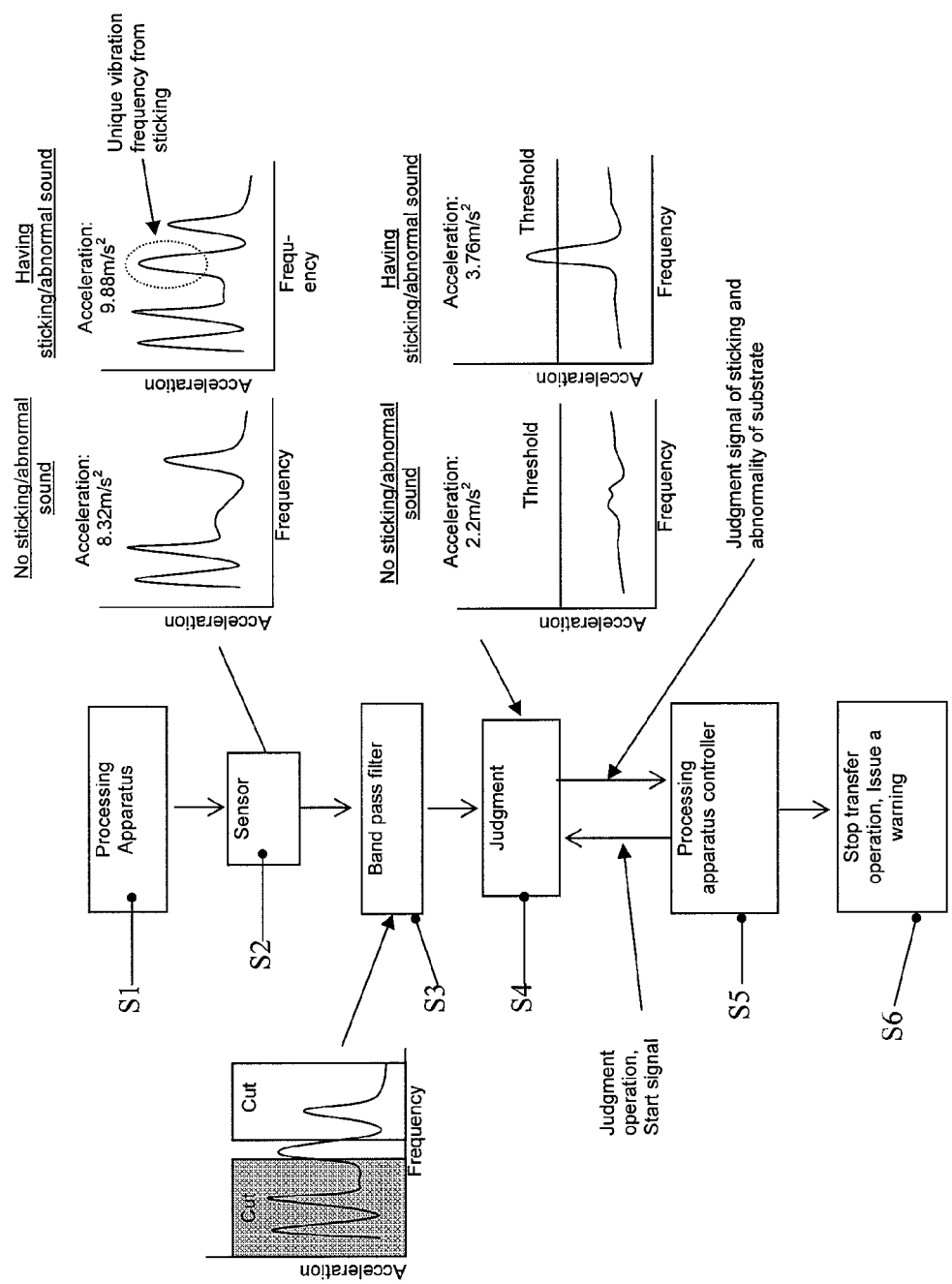
FIG. 2 is a flow chart of a sticking detection method for a plasma CVD apparatus according to an embodiment of the present invention.

FIG. 2 illustrates one example of a flowchart showing how sticking is actually detected. First, the processing apparatus is started and the substrate placed on the susceptor is processed (step 1). Next, sticking vibration transmitted through the processing apparatus is monitored using the sensor (step 2). After film has been formed, the susceptor is lowered, while the substrate is simultaneously lifted up from the susceptor using the lift pins. If filtering is not applied, the vibration acceleration in the measurement frequency range (from several Hz to approx. 20 kHz) was 8.32 $m/s^2$ when there was no sticking (abnormal sound). When sticking (abnormal sound) occurred, the vibration acceleration in the measurement frequency range was 9.88 $m/s^2$. Even if sticking occurs in this condition, it may not manifest as a clear difference in acceleration depending on the condition of sticking or condition of other noises. When filtering was applied (through which frequencies of 4 kHz or less and 8 kHz or more were cot off) (step 3), the vibration acceleration when sticking did not occur became 2.2 $m/s^2$, while the vibration acceleration when sticking occurred was 3.76 $m/s^2$, thereby enabling easy judgment (step 4). In other words, while the acceleration when sticking occurred only increased to 1.2 times the level when sticking did not occur in the above example where filtering was not applied, the acceleration increased to 1.7 times when filtering was applied. Filtering cuts off sounds and vibration accelerations not associated with sticking and allows for identification of vibration accelerations indicative of sticking that are otherwise muffled by other sounds and vibrations.

The substrate may be made of silicon, quartz, gallium arsenic, etc., and depending on the apparatus the lift pins may be made of aluminum or ceramics. These differences in materials may affect sticking vibration. Also, vibration of the processing line and adjacent apparatuses may also negatively affect the detection, and it is therefore desired that noise frequencies be always checked at the start of operation to set thresholds. In an embodiment, cutoff frequencies can be changed at the judgment device, and filter frequencies are also made changeable.

To prevent malfunction caused by judgment operation on a regular basis, it is also possible to output a substrate lift-up timing signal from an apparatus controller to the judgment circuit (step 5) so that when this signal is output to the judgment circuit, the signal can be used to start or stop the judgment operation. As a result, if occurrence of sticking is determined in step 4 a command is issued to the processing apparatus controller (step 5), upon which the transfer operation is stopped and a warning is issued (step 6).

In the present disclosure where conditions and/or structures are not specified, the skilled artisan in the art can readily provide such conditions and/or structures, in view of the present disclosure, as a matter of routine experimentation.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method of detecting the occurrence of sticking of a substrate in a reaction chamber for processing the substrate placed on a surface of a substrate-supporting device provided with lift pins for moving the substrate up and down with respect to the surface of the substrate-supporting device, comprising the steps of:

monitoring a vibration propagating in or through the reaction chamber by a sensor, said vibration being generated as a result of separating the substrate from the surface of the substrate-supporting device when the substrate is raised by the lift pins, and being indicative of and specific to sticking of the substrate on the surface of the substrate-supporting device when being moved up from the surface of the substrate-supporting device with the lift pins; and initiating a pre-designated sequence if the vibration is detected while processing the substrate in the reaction chamber.

2. The method according to claim 1, wherein the vibration indicative of and specific to the sticking of the substrate is detected when the vibration has an intensity exceeding a pre-determined threshold value.

3. The method according to claim 1, wherein the vibration indicative of and specific to the sticking of the substrate is detected only when the substrate is moved up by the lift pins.

4. The method according to claim 1, wherein the step of monitoring the vibration comprises monitoring an acceleration ($m/s^2$) of vibrations including the vibration indicative of and specific to the sticking of the substrate.

5. The method according to claim 1, wherein the vibration indicative of and specific to the sticking of the substrate has a frequency of more than 4 kHz and less than 8 kHz.

6. The method according to claim 1, wherein the step of monitoring the vibration comprises:

sensing vibrations propagating in or through the reaction chamber by the sensor; and filtering a signal outputted from the sensor to detect the vibration indicative of the sticking of the substrate, based on the frequency of the vibrations.

7. The method according to claim 6, wherein the step of filtering the signal comprises:

filtering out a portion of the signal having frequencies of 4 kHz or less; and filtering out a portion of the signal having frequencies of 8 kHz or more.

8. The method according to claim 1, wherein the step of initiating the pre-designated sequence comprises setting off a warning signal and stopping a process of transferring the substrate.

9. The method according to claim 1, wherein the sensor uses a piezoelectric element which outputs electrons.

10. A method of detecting the occurrence of sticking of a substrate in a reaction chamber for processing the substrate placed on a surface of a substrate-supporting device provided with lift pins for moving the substrate up and down with respect to the surface of the substrate-supporting device, comprising the steps of:

monitoring a vibration propagating in or through the reaction chamber by a sensor, said vibration being indicative of and specific to sticking of the substrate on the surface of the substrate-supporting device when being moved up from the surface of the substrate-supporting device with the lift pins; and initiating a pre-designated sequence if the vibration is detected while processing the substrate in the reaction chamber, wherein the sensor is installed on an outer surface of a portion of the reaction chamber, said portion being capable of propagating the vibration generated by an impact caused when a back surface of the substrate is rebounded against tips of the lift pins.

11. The method according to claim 10, wherein the sensor is installed on an outer metal surface at a bottom of the reaction chamber.

12. The method according to claim 1, wherein the substrate-supporting device is a susceptor, and the reaction chamber is a reactor for semiconductor-processing.

13. The method according to claim 12, wherein the lift pins are inserted in through-holes formed in the substrate-supporting device through the surface in its axial direction.

14. The method according to claim 13, wherein the vibration indicative of and specific to the sticking of the substrate is detected only when the substrate is moved up by the lift pins after a film is formed on the substrate and the susceptor descends to a position for transferring the substrate.

15. A system of detecting the occurrence of sticking of a substrate in a reaction chamber for processing the substrate placed on a surface of a substrate-supporting device provided with lift pins for moving the substrate up and down with respect to the surface of the substrate-supporting device, comprising:

a sensor for monitoring a vibration propagating in or through the reaction chamber, said vibration being generated as a result of separating the substrate from the surface of the substrate-supporting device when the substrate is raised by the lift pins, and being indicative of and specific to sticking of the substrate on the surface of the substrate-supporting device when being moved up from the surface of the substrate-supporting device with the lift pins; and a controller for initiating a pre-designated sequence if the vibration is detected while processing the substrate in the reaction chamber.

16. The system according to claim 15, wherein the substrate-supporting device is a susceptor, and the reaction chamber is a reactor for semiconductor-processing.

17. The system according to claim 15, wherein the lift pins are positioned to contact the back surface of the substrate and are the only pins protruding from the substrate-supporting device surface.

18. The system according to claim 15, wherein the controller detects the vibration indicative of and specific to the sticking of the substrate when the vibration has an intensity exceeding a pre-determined threshold value.

19. The system according to claim 15, wherein the controller detects the vibration indicative of and specific to the sticking of the substrate only when the substrate is moved up by the lift pins.

20. The system to claim 15, wherein the sensor monitors an acceleration (m/s$^2$) of vibrations including the vibration indicative of and specific to the sticking of the substrate.

21. The system according to claim 15, wherein the sensor monitors vibrations having a frequency of more than 4 kHz and less than 8 kHz.

22. The system according to claim 15, further comprising a band pass filter for filtering out a portion of the signal having frequencies of 4 kHz or less and a portion of the signal having frequencies of 8 kHz or more.

23. The system according to claim 15, wherein the controller sets off a warning signal and stops a process of transferring the substrate when the vibration is detected.

24. The system according to claim 15, wherein the sensor is a sensor using a piezoelectric element which outputs electrons.

25. A system of detecting the occurrence of sticking of a substrate in a reaction chamber for processing the substrate placed on a surface of a substrate-supporting device provided with lift pins for moving the substrate up and down with respect to the surface of the substrate-supporting device, comprising:

a sensor for monitoring a vibration propagating in or through the reaction chamber, said vibration being indicative of and specific to sticking of the substrate on the surface of the substrate-supporting device when being moved up from the surface of the substrate-supporting device with the lift pins; and a controller for initiating a pre-designated sequence if the vibration is detected while processing the substrate in the reaction chamber, wherein the sensor is installed on an outer surface of a portion of the reaction chamber, said portion being capable of propagating the vibration generated by an impact caused when a back surface of the substrate is rebounded against tips of the lift pins.

26. The system according to claim 25, wherein the sensor is installed on an outer metal surface at a bottom of the reaction chamber.

* * * * *